United States Patent
Lewis et al.

(10) Patent No.: US 8,245,467 B2
(45) Date of Patent: Aug. 21, 2012

(54) APPARATUS AND METHOD FOR JOINING BUILDING COMPONENTS

(75) Inventors: Michael S. Lewis, Lake Forest Park, WA (US); Bryan A. Branscome, Camano Island, WA (US); Dean W. Habersetzer, Everett, WA (US); Chris G. McInelly, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/619,597

(22) Filed: Nov. 16, 2009

(65) Prior Publication Data

US 2010/0095624 A1   Apr. 22, 2010

Related U.S. Application Data

(62) Division of application No. 11/395,580, filed on Mar. 31, 2006, now abandoned.

(51) Int. Cl.
*E04B 1/38* (2006.01)

(52) U.S. Cl. .......................... 52/282.3; 52/287.1; 52/468

(58) Field of Classification Search ................ 52/282.5, 52/282.3, 282.1, 287.1, 582.1, 464, 468; 403/169
See application file for complete search history.

(56) References Cited

U.S. PATENT DOCUMENTS

| | | | | |
|---|---|---|---|---|
| 3,192,671 A * | 7/1965 | Smith | .............................. | 52/434 |
| 3,261,493 A * | 7/1966 | Smith | .............................. | 217/65 |
| 3,380,768 A | 4/1968 | Wolfensberger | | |
| 3,381,430 A | 5/1968 | Wiczer | | |
| 3,635,515 A * | 1/1972 | White et al. | .................. | 296/164 |
| 3,738,083 A * | 6/1973 | Shimano | ....................... | 52/584.1 |
| 3,854,269 A * | 12/1974 | Hancock | ....................... | 220/683 |
| 3,989,157 A * | 11/1976 | Veenema | ...................... | 220/4.28 |
| 4,159,557 A | 7/1979 | Pittasch et al. | | |
| 4,161,853 A * | 7/1979 | Weiss et al. | .................. | 52/288.1 |
| 4,189,885 A * | 2/1980 | Fritz | ............................. | 52/287.1 |
| 4,356,672 A * | 11/1982 | Beckman et al. | .............. | 52/36.6 |
| 4,430,833 A * | 2/1984 | Balzer et al. | ..................... | 52/255 |
| 4,477,201 A | 10/1984 | Yoshiyuji | | |
| 4,542,933 A * | 9/1985 | Bischoff | ........................ | 296/164 |
| 4,558,797 A * | 12/1985 | Mitchell | ........................ | 220/668 |
| 4,689,930 A * | 9/1987 | Menchetti | ........................ | 52/277 |
| 4,712,942 A * | 12/1987 | Brown | ............................ | 403/174 |
| 4,828,132 A | 5/1989 | Francis, Jr. et al. | | |
| 4,840,440 A | 6/1989 | Dieter | | |
| 4,902,068 A | 2/1990 | Dowd et al. | | |
| D315,215 S * | 3/1991 | Schnebly | ....................... | D25/119 |
| 5,170,603 A * | 12/1992 | Bartlett | ......................... | 52/282.3 |
| 5,282,832 A | 2/1994 | Toso et al. | | |
| 5,404,684 A | 4/1995 | Schwendeman | | |
| 5,448,799 A * | 9/1995 | Stein, Jr. | ......................... | 16/225 |
| 5,564,806 A * | 10/1996 | Keisling et al. | ................ | 312/263 |
| 5,690,239 A * | 11/1997 | Ballard | ........................... | 211/189 |
| 5,729,867 A | 3/1998 | Carmichael | | |

(Continued)

*Primary Examiner* — Christine T Cajilig
(74) *Attorney, Agent, or Firm* — The Boeing Company

(57) ABSTRACT

A joint apparatus and method of assembly is disclosed for connecting building components such as panels, door jamb assemblies, windows and other structures. The apparatus includes an engagement structure with retaining elements that couple building components without the need for mechanical fasteners. The retaining element may contain serrations on which an adhesive is applied before a panel or other building component is secured to the joint apparatus. Other building components such as hinge assemblies include coupling members with a flange. The slots along a retaining element allows coupling members to snap fit into the joint apparatus once a flange is secured into the slots in order to lock the components.

7 Claims, 5 Drawing Sheets

U.S. PATENT DOCUMENTS

| | | | |
|---|---|---|---|
| 5,806,253 A * | 9/1998 | Nelson | 52/179 |
| 5,983,583 A | 11/1999 | Mattix et al. | |
| 6,173,547 B1 | 1/2001 | Lipson | |
| 6,378,253 B1 * | 4/2002 | Richardson | 52/204.5 |
| 6,446,824 B1 | 9/2002 | Sluiter | |
| 6,585,330 B2 | 7/2003 | Bruce | |
| 6,668,514 B2 | 12/2003 | Skov | |
| 7,047,576 B2 | 5/2006 | Tavivian | |

* cited by examiner

US 8,245,467 B2

APPARATUS AND METHOD FOR JOINING BUILDING COMPONENTS

CROSS REFERENCE TO RELATED APPLICATION

This application claims priority to and is a divisional of U.S. patent application Ser. No. 11/395,580 filed Mar. 31, 2006 now abandoned, which is hereby incorporated by reference.

FIELD OF THE INVENTION

The present invention generally relates to a joint apparatus for facilitating the assembly of building components such as panels, hinge assemblies, latch assemblies, door stops, and other structural elements. These building components may be installed within a commercial aircraft. A building component is secured to the joint apparatus using adhesive or snap fit locking engagement. In addition, the invention relates to a method and apparatus for coupling and supporting building components in planar or angular relation.

DESCRIPTION OF RELATED ART

Structural joint connectors have use in a variety of manufacturing and building applications to create many different products. The connectors have numerous functions that include joining panels and various different building components during production. A variety of different connectors have been developed to interconnect structural elements.

Existing devices used to secure panels and other components include the use of an extrusion with flanges designed to fit along a panel edge. Mechanical fasteners are commonly installed through the flange and into the panel in order to strengthen the joint. Other connectors that include straps, angles, edges, and end fittings with a greater thickness or different material are used to enhance the strength of joints. For example aircraft industries have created aluminum connectors to join walls, panels, and barriers for aircraft interiors.

In aerospace applications, size and weight considerations are paramount. Many existing structural components were created to decrease weight, size, or the amount of material required while providing sufficient strength to ensure an effective joint. In addition, the amount of labor hours required to assemble the components must also be considered in order to minimize manufacturing costs. Accordingly, there is a continuing need in the art for building components that are lightweight, size efficient, cost effective, and easy to assemble.

BRIEF SUMMARY OF THE INVENTION

According to one aspect of the invention, a lightweight and compact joint apparatus provides a secure structural connection for building components such as wall panels and hinge assemblies while reducing the amount of labor hours required during assembly.

According to another aspect, of the invention, the joint apparatuses and methods provide a rigid connection for a variety of building components. A small, lightweight, and sturdy apparatus that connects two adjacent panels or joins a panel with another distinctive building component includes a channel with an engagement structure that allows building components to connect without the need of mechanical fasteners. The joint apparatus may interlock with a portion of each of the adjacent panels to secure them together. It is also a feature of this invention to provide a novel method of ensuring that a solid structural joint results.

According to another aspect, a snap fit locking engagement secures each building component to the joint apparatus. Slots and engagement structures along with a consistently designed coupling enhance the strength of a joint.

Other objects, features, and advantages of the invention will become apparent to those skilled in the art from a consideration of the following detailed description taken in conjunction with the accompanying drawings.

DETAILED DESCRIPTION OF THE INVENTION

Figure 1:
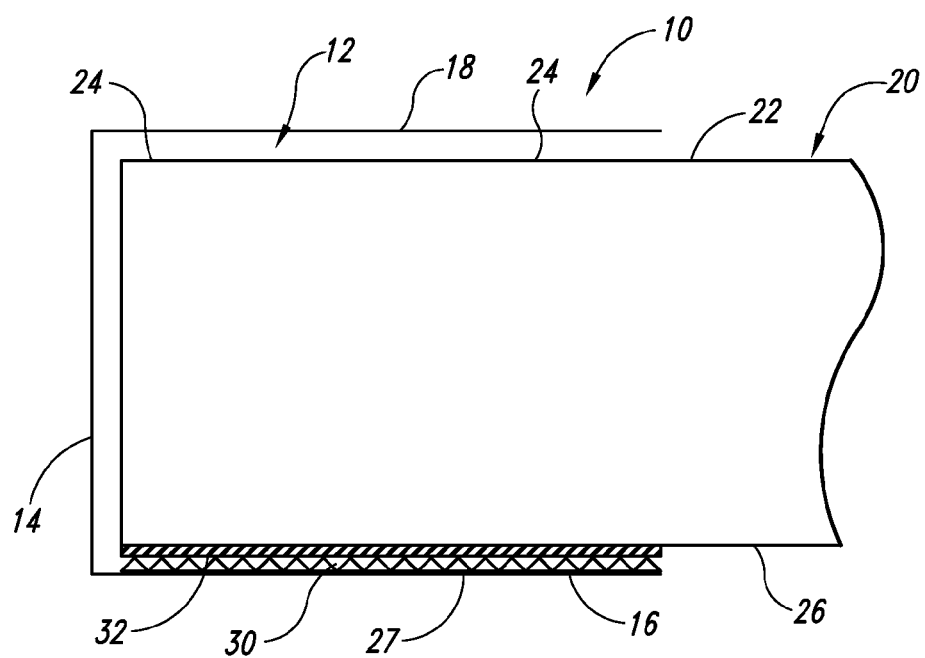
FIG. 1 is a cross sectional view of an embodiment of the joint apparatus with a single building component.

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein:

FIG. 1 shows a partial view of a joint apparatus 10 which includes a channel 12 formed by an engagement structure 14. An engagement structure 14 may include a first retaining element 16 to enhance the strength of a coupling between the joint apparatus and a building component 20 such as a panel, a hinge assembly, or a door stop installed in aircraft interiors. The embodiment comprises an engagement structure 14 that may include a first retaining element 16 and a second retaining element 18 that are configured to engage with an insert structure 24 of a building component 20 that has a planar surface 26 such as a panel 22. Retaining elements 16, 18 may configured to engage with a panel 22 that has a complementary configured insert structure 24.

The joint apparatus 10 is small and lightweight and has the strength to couple building component 20. It may be fabricated from an aluminum alloy material such as 7075 or 2024.

The retaining element 16 in the embodiment shown in FIG. 1 includes a treated surface 27 with serrations 30 to enhance the rigidity of the coupling such that a channel 12 can secure a building component 20 without the use of additional mechanical fasteners such as screws, bolts, etc.

A substance used for bonding, such as adhesive 32, may also be applied to a retaining element 16 prior to contact with an insert structure 24 of a building component 20. The serrations 30 are approximately 0.010 inch deep to ensure proper bonding. The size of a joint apparatus and method used to install a building component may be adapted to satisfy strength requirements and minimize the dimensions of the component.

The size of retaining elements 16, 18, described in the embodiment along with method of joining, characteristics of an adhesive 32, and use of serrations 30 enhance the strength of the joint and eliminate the need for a building component, such as a panel, with a thickness greater than 1 inch. This can result in a significant reduction in size and weight in order to satisfy requirements for products such as aircraft interiors. The length of the retaining elements 16, 18 are approximately 0.50 inch in order to retain a building component 20 that is approximately 0.50 inch wide.

Figure 2:
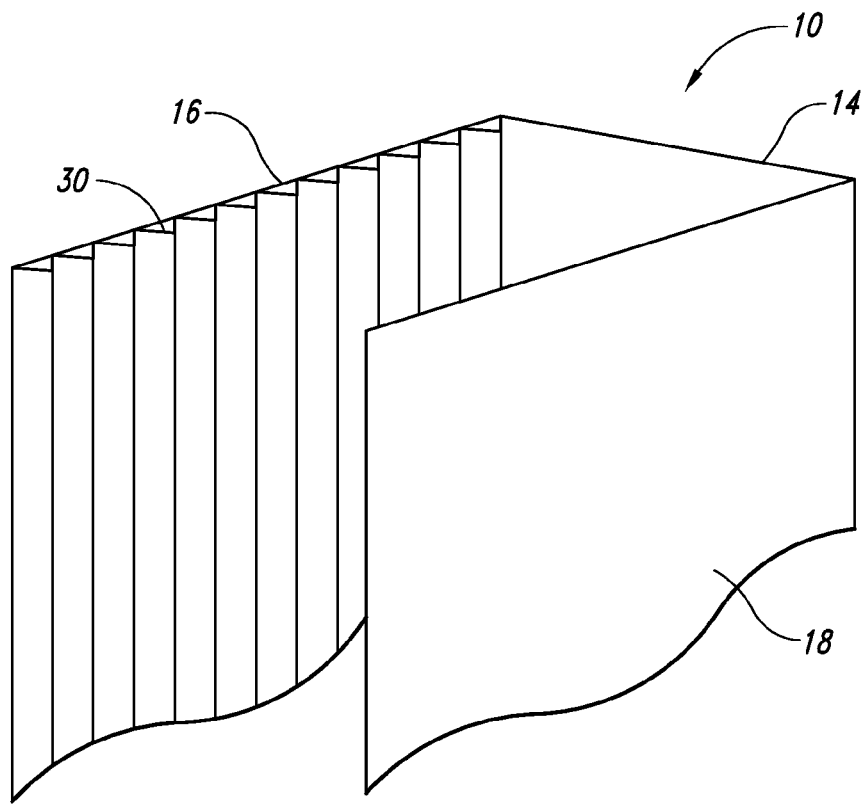
FIG. 2 is a perspective view of a joint apparatus embodiment similar to that illustrated in FIG. 1.

FIG. 2 illustrates a joint apparatus 10 with an engagement structure 14. An engagement structure includes retaining elements 16, 18 and serrations 30.

Figure 3:
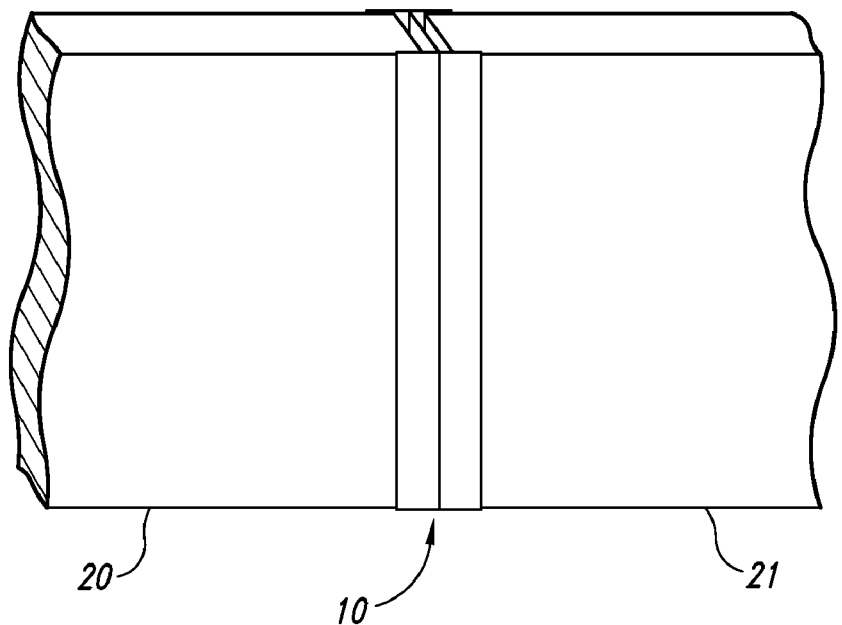
FIG. 3 is a perspective view of an embodiment of a joint apparatus coupling two building components.

FIG. 3 illustrates a joint apparatus 10 that couples first and second building components 20, 21.

Figure 4:
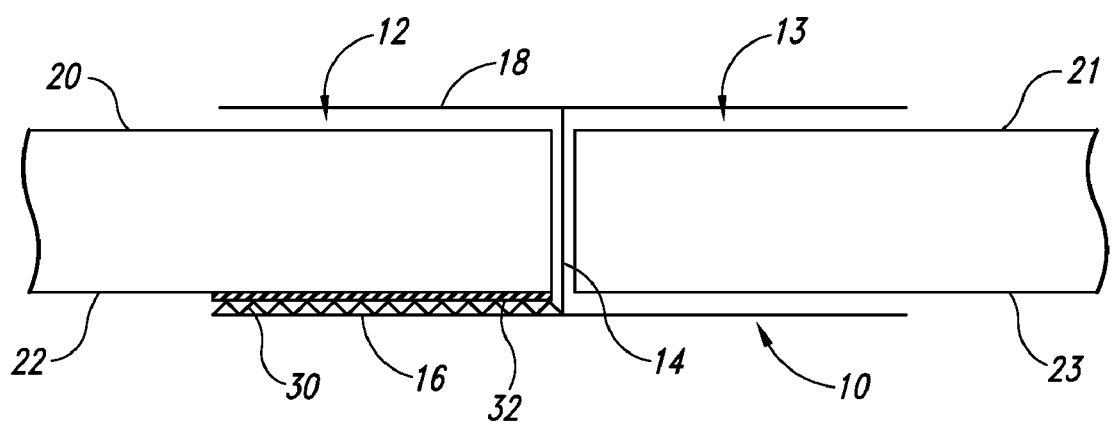
FIG. 4 is a cross sectional view of a joint apparatus and two building components.

The joint apparatus 10 illustrated in FIG. 4 includes channels 12, 13. Each channel includes an engagement structure 14 with retaining elements 16, 18 to join more than one building component such as panels 22, 23. A retaining element 16 in the embodiment shown in FIG. 4 includes serrations 30 to enhance the bond strength of an adhesive 32 which is applied prior to coupling an insert structure 20 to a joint apparatus 10. The assembly of FIG. 4 is exemplary only, and the joining apparatus disclosed and/or claimed herein may be used to connect numerous other building components such as hinge assemblies, latches, and stops.

Figure 5:
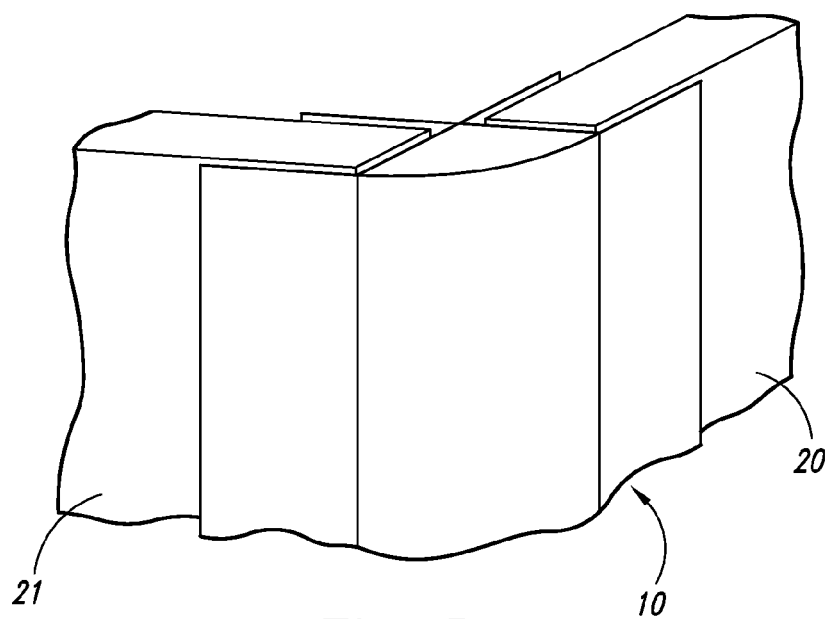
FIG. 5 is a perspective view of a joint apparatus and two building components at a corner.

Another alternative embodiment of the present invention is illustrated in FIG. 5 which includes a joint apparatus 10 coupling two building components 20, 21 at a corner.

Figure 6:
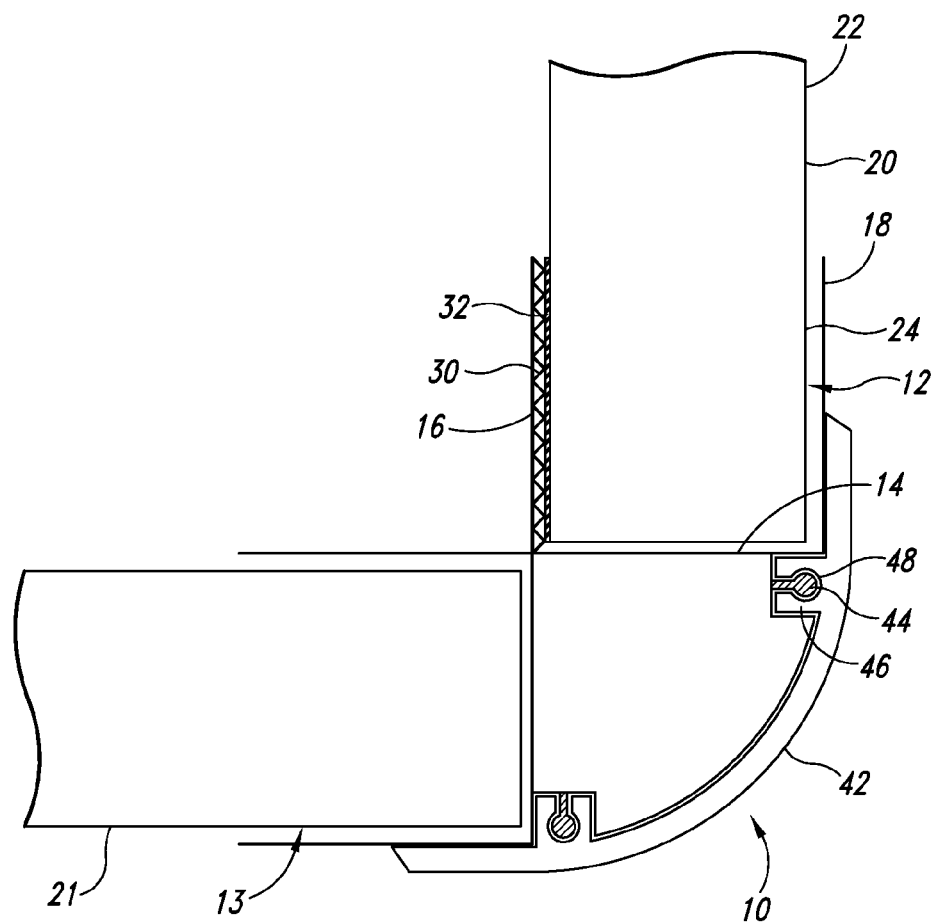
FIG. 6 is a cross sectional view of the joint apparatus illustrated in FIG. 5.

FIG. 6 illustrates a joint apparatus 10 that includes a first channel 12 and a second channel 13 that bridge two building components 20, 21 at an angle. A first channel 12 includes an engagement structure 14 comprising a first retaining element 16 and a second retaining element 18. An adhesive 32 is applied over serrations 30, which extend from a retaining element before a building component such as a panel 22 is inserted into a channel 12 and supported by an engagement structure 14. A retaining elements 16, 18 are configured to engage with a building apparatus 22 that has a complementary configured insert structure 24.

The embodiment in FIG. 6 also includes a decorative layer and/or protective rub strip 42 that is attached to a joint apparatus 10. The embodiment includes a projection 44 extending from a joint apparatus 10 that secure a rub strip 42 to a joint apparatus 10. A rub strip 42 has a structural extension 46 and a retainer cavity 48 that is compatible with a projection 44 in order to provide a means of snap fit fastening. This is created to ensure quick disassembly and installation in order to accomplish maintenance, repairs, or modifications.

Figure 7:
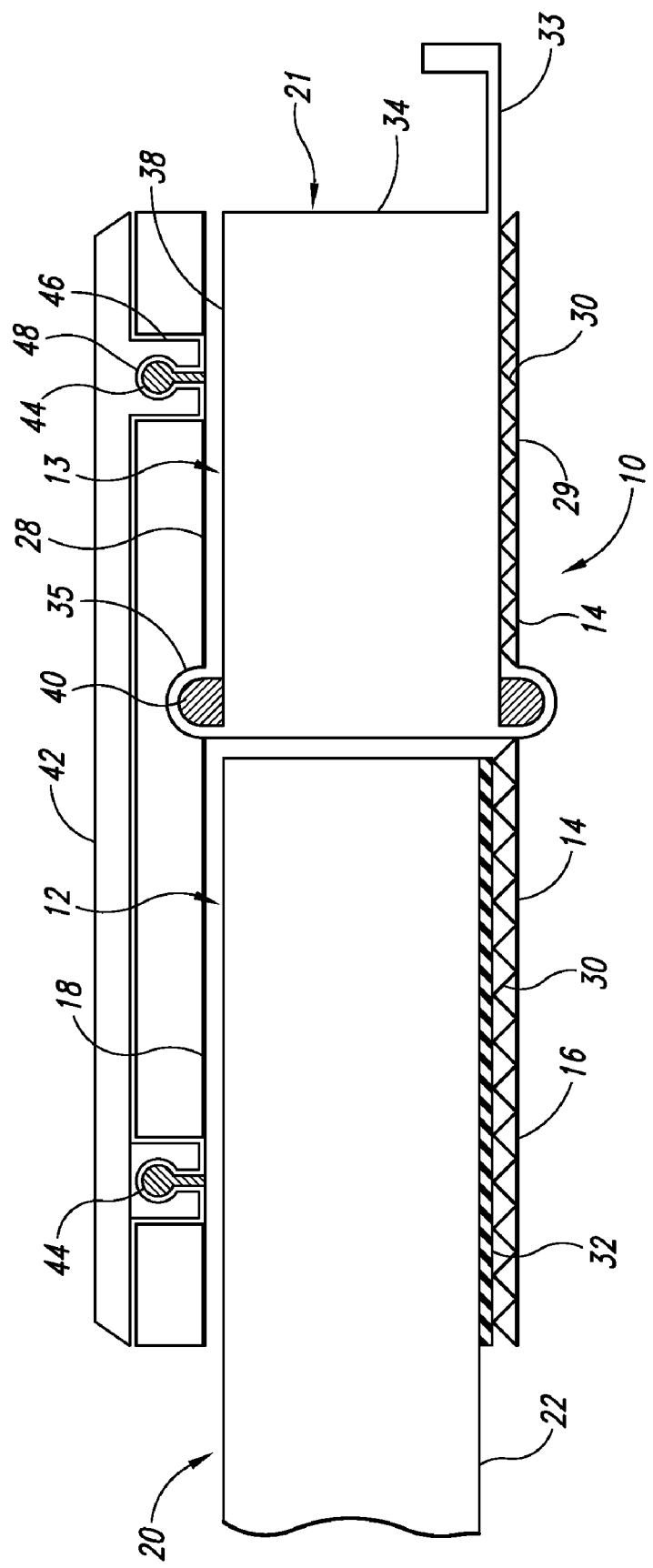
FIG. 7 is a cross sectional view of a joint apparatus and two building components.

Another alternative embodiment of the present invention is illustrated in FIG. 7 which is a cross sectional view of a joint apparatus 10 that includes a first channel 12 and a second channel 13 that couple two building components 20, 21. A first channel 12 includes an engagement structure 14 comprising a first retaining element 16 and a second retaining element 18. An adhesive 32 is applied over serrations 30 which extend from a retaining element before a building component such as a panel 22 is inserted into a channel 12 and supported by an engagement structure 14.

The second channel 13 includes an engagement structure 14 with retaining elements 28, 29 to secure a second building component 21. A building component 21 may be a jamb element 34 such as a door stop 33, hinge assembly or latch assembly. Retaining elements 28, 29 illustrated in the embodiment include a slot 35 to secure a door stop 33 to a joint assembly 10. Door stop 33 includes a coupling member 38 that fits into an engagement structure 14. Upon insertion of a coupling member 38, a flange 40 on a coupling member 38 snap-fits into slots 35 located along an engagement structure 14, The snap-fit connection is accomplished once the flange 40 is snugly fit into the slots 35 in order to secure a building component 21 onto a joint apparatus 10 without the use of mechanical fasteners. In another embodiment, a flange 40 on an engagement structure may be used to fit into a slot 35 on a coupling portion 38 of a building component 21 in order to snap-fit upon insertion.

Each embodiment may include a universal retaining element, 29. In addition to a slot 35, a retaining element 29 comprises a treated surface with serrations 30 for use when joining a building component that does not include a coupling member 38 with a flange 40. Serrations 30 enhance rigidity to allow a channel 13 to secure a building component that does not include a flange 40. The embodiment includes an adhesive that is applied over serrations 30, before a building component 21 such as a panel 22 is inserted into a channel 13 and supported by an engagement structure 28, 29.

Referencing FIG. 7 in some of the embodiments, a decorative layer and/or protective rub strip 42 may be attached to a joint apparatus 10. The apparatus illustrated in the embodiment includes projections 44 extending from an engagement structure 14 that secure a rub strip 42 to a joint apparatus 10. Rub strip 42 includes a structural extension 46 and a retainer cavity 48 that is compatible with a projection 44 in order to provide a means of snap fit fastening. This is created to ensure quick disassembly and installation in order to accomplish maintenance, repairs, or modifications.

Figure 8:
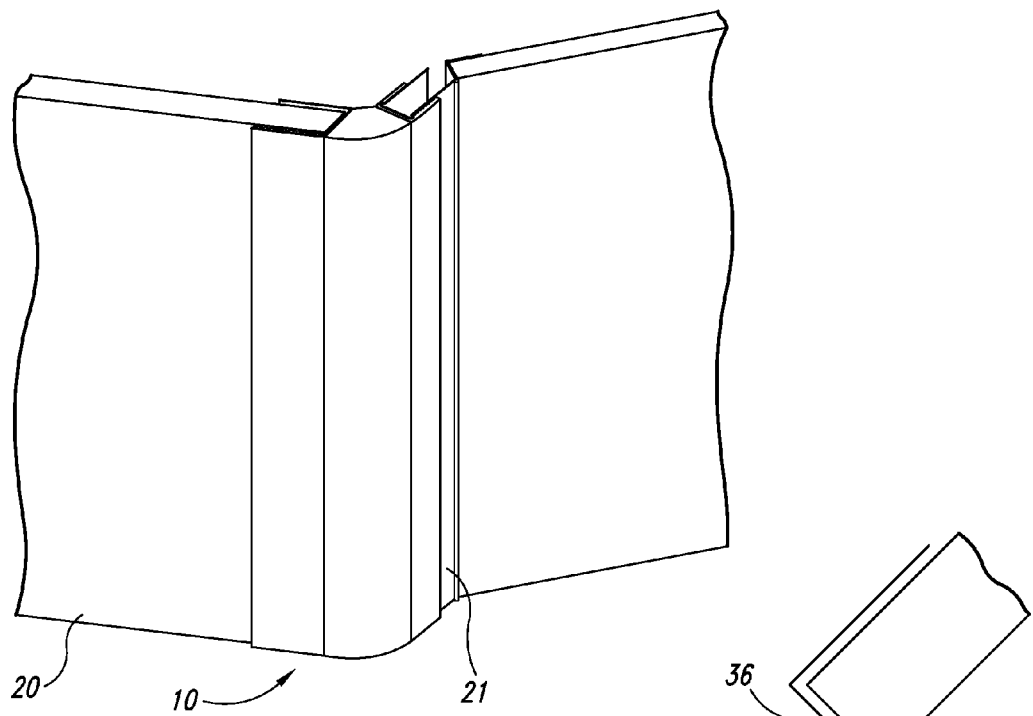
FIG. 8 illustrates a joint apparatus with two building components at a corner.

A joint apparatus 10 that couples two building components, 20, 21 at a corner is illustrated in FIG. 8.

Figure 9:
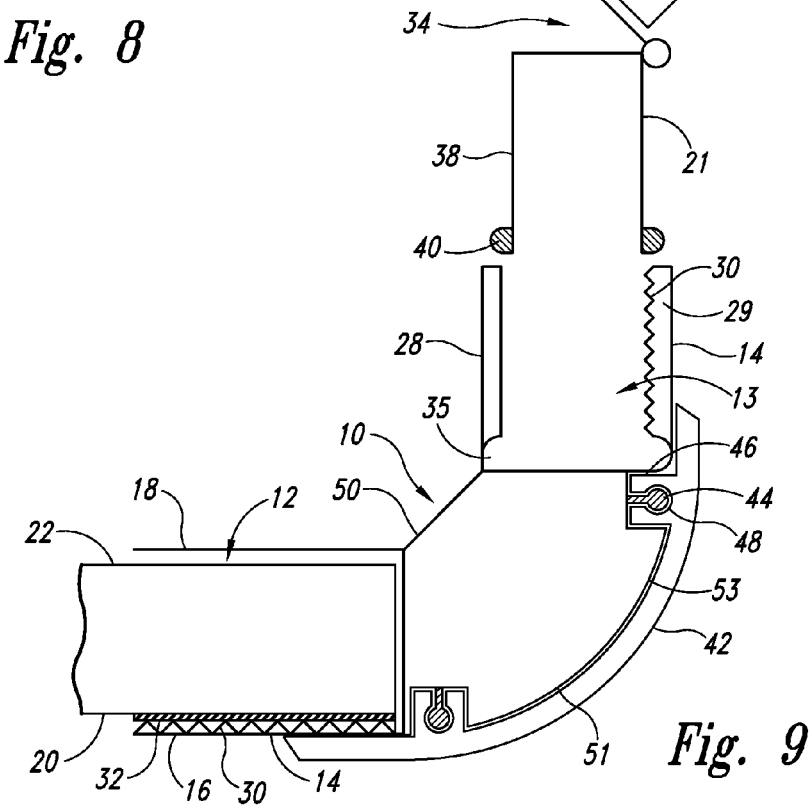
FIG. 9 is a cross sectional view of the embodiment illustrated in FIG. 8

FIG. 9 is a cross section illustration of an embodiment of the invention that includes use of a joint apparatus 10 connecting building components 20, 21 at a corner. A joint apparatus includes two channels 12, 13, a first connector 50, and a second connector 51. A first connector 50, may be attached to retaining elements 18, 28 at an angle. A second connector 51 may be fabricated with a curved surface 53 and attached to retaining elements 16, 29 in parallel. Referring to FIG. 9, the rub strip 42 may be at least 30% curved to create a rub curved surface that contacts the second connector 51 along the curved surface 53 while connected to the projection 44.

The first channel 12 includes an engagement structure 14 comprising a first retaining element 16 and a second retaining element 18. An adhesive 32 is applied over serrations 30, which extend from a retaining element 16 before a building component 20 such as a panel 22 is inserted into a channel 12 and supported by a engagement structure 14. The use of serrations and adhesive enhance the strength of the joint and eliminate the need for mechanical fasteners such as bolts, screws, nails, rivets or pins.

The second channel 13 includes an engagement structure 14 with retaining elements 28, 29 to secure a second building component 21. A building component may be a jamb element 34 such as a hinge assembly 36, door stop, or latch assembly.

Hinge assembly 36 includes a coupling member 38 that fits into a engagement structure 14. Upon insertion of a coupling member 38, a flange 40 extending from a coupling portion 38 snap-fits into slots 35 located along an engagement structure 14. The snap-fit connection allows a flange 40 to snugly fit into slots 35 and secure hinge assembly 36 to a joint apparatus, 10 without the use of mechanical fasteners such as a screw, bolt, nail pin, or rivet. In another embodiment, flanges on an engagement structure 14 can be used to fit into slots 35 on a coupling portion 38 of a building component 21 in order to snap-fit upon insertion.

In addition to a slot 35 or a flange 40, a retaining element 29 comprises a treated surface with serrations 30 for use when joining a building component that does not include a coupling member 38 with a flange 40. Serrations 30 enhance rigidity to allow a channel 13 to secure a building component that does not include a flange 40. The embodiment includes an adhesive that is applied over serrations 30, before a building component 21 such as a panel 22 is inserted into a channel 13 and supported by an engagement structure 28, 29

With continued reference to FIG. 9, in other embodiments a joint apparatus may also include a decorative layer and/or protective rub strip 42 that is attached to a joint apparatus 10. A joint apparatus illustrated in the embodiment includes projections 44 extending from an engagement structure 14 that secure rub strip 42 to a joint apparatus 10. Rub strip 42 has a structural extension 46 and a retainer cavity 48 that is compatible with a projection 44 in order to provide a means of snap fit fastening. This is created to ensure quick disassembly and installation in order to accomplish maintenance, repairs, replacement, or modifications.

Those skilled in the art will understand that the preceding exemplary embodiments of the invention provide the foundation for numerous alternatives and modifications thereto. These other modifications are also within the scope of the invention. Accordingly, the invention is not limited to that precisely as shown and described above.

What is claimed is:

1. A joining apparatus to strengthen coupling and engage with building components, the apparatus comprising:
    at least one connector that includes a curved surface;
    at least one building component that includes at least one insert structure;
    at least one channel that includes at least one retaining element and configured to receive the at least one insert structure;
    at least one engagement structure disposed in said at least one channel such that the building components are securable in the at least one channel without the use of additional mechanical fasteners;
    at least one projection extending from the at least one connector;
    a rub strip having a rub curved surface and at least one structural extension for fastening with the at least one projection such that the rub strip is snap-fit fastenable for quick installation and disassembly; wherein the rub strip is at least 30% circuitous, in contact with the curved surface and reinforced by the at least one retaining element to enhance the ability of the rub strip to withstanding direct impact.

2. The apparatus of claim 1 further comprising a first retaining element, and a second retaining element that are configured to engage with the at least one insert structure of the building components having a planar surface.

3. The apparatus of claim 2 wherein the at least one engagement structure includes the first retaining element and the second retaining element and wherein the at least one-channel includes a first channel and a second channel; and the first channel comprises the first retaining element, the second retaining element, and adhesive on the first retaining element that provides rigidity to allow the first channel to secure the insert structure without a requirement of any flange.

4. The apparatus of claim 3 wherein the at least one insert structure comprises at least one of hinge assemblies, latches, and stops.

5. The apparatus of claim 1 wherein the at least one insert structure comprises a first and a second insert structure; and wherein at least one of the first and the second insert structure includes a jamb element.

6. The apparatus of claim 1 further comprising a hinge assembly that includes a coupling member that fits into the at least one engagement structure to secure the hinge assembly to the joining apparatus.

7. The apparatus of claim 5 wherein the jamb element includes at least one of the following: a door stop, a hinge assembly, and a latch assembly.

\* \* \* \* \*